(12) United States Patent
Ma et al.

(10) Patent No.: US 12,516,184 B2
(45) Date of Patent: Jan. 6, 2026

(54) ADHESIVE COMPOSITION

(71) Applicant: Dow Global Technologies LLC, Midland, MI (US)

(72) Inventors: Wanfu Ma, Shanghai (CN); Allan Walter McLennaghan, Horgen (CH); Jozef J.I. Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 910 days.

(21) Appl. No.: 17/606,389

(22) PCT Filed: Apr. 26, 2019

(86) PCT No.: PCT/CN2019/084574
§ 371 (c)(1),
(2) Date: Oct. 25, 2021

(87) PCT Pub. No.: WO2020/215319
PCT Pub. Date: Oct. 29, 2020

(65) Prior Publication Data
US 2022/0195158 A1    Jun. 23, 2022

(51) Int. Cl.
| | | |
|---|---|---|
| C08L 23/26 | (2025.01) | |
| C08K 5/00 | (2006.01) | |
| C08K 5/01 | (2006.01) | |
| C08L 23/0807 | (2025.01) | |
| C08L 23/14 | (2006.01) | |

(Continued)

(52) U.S. Cl.
CPC .......... *C08L 23/0815* (2013.01); *C08K 5/005* (2013.01); *C08K 5/01* (2013.01); *C08L 23/147* (2013.01); *C08L 23/26* (2013.01); *C08L 91/06* (2013.01); *C09J 7/243* (2018.01); *C09J 123/0815* (2013.01); *C09J 123/147* (2013.01); *B32B 2307/582* (2013.01); *C08L 2205/03* (2013.01); *C09J 191/06* (2013.01); *C09J 2301/312* (2020.08); *C09J 2301/408* (2020.08); *C09J 2423/04* (2013.01); *C09J 2451/00* (2013.01); *C09J 2491/00* (2013.01)

(58) Field of Classification Search
None
See application file for complete search history.

(56) References Cited

U.S. PATENT DOCUMENTS 5,677,383 A    10/1997   Chum et al.
6,111,023 A    8/2000    Chum et al.
(Continued)

FOREIGN PATENT DOCUMENTS

CN    106366543 A    2/2017
JP    2001131367 A   5/2001
(Continued)

*Primary Examiner* — Frank D Ducheneaux
(74) *Attorney, Agent, or Firm* — Boyle Fredrickson S.C.

(57) ABSTRACT

A composition contains (A) an ethylene/a-olefin copolymer having a density from 0.855 g/cc to 0.895 g/cc and a melt viscosity, at 177° C., from 5,000 mPa-s to 50,000 mPa-s; (B) a functionalized propylene-based polymer containing from 1 wt % to 10 wt % functional groups, the functionalized propylene-based polymer having a melt viscosity, at 190° C., from greater than 10,000 mPa-s to 50,000 mPa-s and a weight average molecular weight, Mw, greater than 30,000 g/mol; (C) a tackifier; and (D) a wax.

12 Claims, 1 Drawing Sheet

(51) Int. Cl.
*C08L 91/06* (2006.01)
*C09J 7/24* (2018.01)
*C09J 123/08* (2006.01)
*C09J 123/14* (2006.01)
*C09J 191/06* (2006.01)

(56) References Cited

U.S. PATENT DOCUMENTS

| | | | |
|---|---|---|---|
| 6,153,701 A * | 11/2000 | Potnis | C08L 23/10 524/240 |
| 6,552,118 B2 * | 4/2003 | Fujita | C09J 143/04 524/904 |
| 8,148,466 B2 | 4/2012 | Wood et al. | |
| 9,387,652 B2 * | 7/2016 | Doornheim | G09F 3/10 |
| 9,822,283 B2 | 11/2017 | Inoue | |
| 10,329,461 B2 | 6/2019 | Chen et al. | |
| 10,487,247 B2 | 11/2019 | Jin et al. | |
| 10,525,682 B2 * | 1/2020 | Zennyoji | H01B 3/447 |
| 2005/0261426 A1 | 11/2005 | Wood et al. | |
| 2009/0004489 A1 * | 1/2009 | Laiho | C08L 23/0815 524/502 |
| 2009/0203847 A1 | 8/2009 | Ellis et al. | |
| 2013/0295380 A1 | 11/2013 | Merrill et al. | |
| 2014/0199908 A1 | 7/2014 | Inoue | |
| 2015/0114583 A1 | 4/2015 | Takamori | |
| 2015/0166850 A1 | 6/2015 | Tse | |
| 2015/0259563 A1 | 9/2015 | Ibanez et al. | |
| 2015/0361315 A1 | 12/2015 | Karjala et al. | |
| 2016/0272853 A1 | 9/2016 | Takamori | |
| 2017/0101559 A1 | 4/2017 | Takamori | |
| 2017/0292045 A1 | 10/2017 | Chen et al. | |
| 2018/0002578 A1 * | 1/2018 | Kauffman | C08L 23/0815 |
| 2018/0265753 A1 | 9/2018 | Jin et al. | |

FOREIGN PATENT DOCUMENTS

| | | |
|---|---|---|
| JP | 2008-214539 A | 9/2008 |
| WO | 2014/105244 A1 | 7/2014 |
| WO | 2018/037849 A1 | 3/2018 |

* cited by examiner

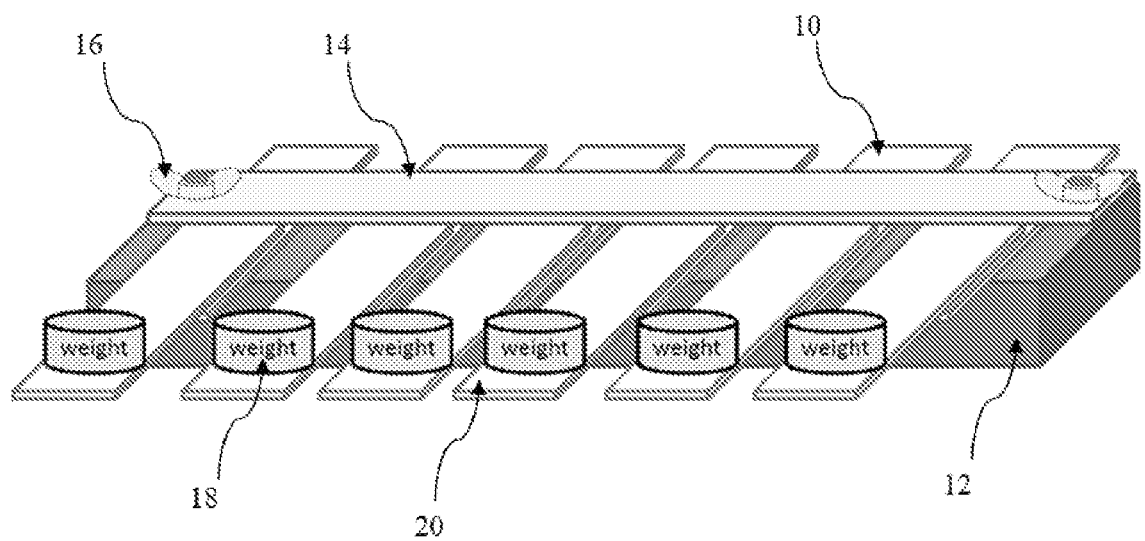

ADHESIVE COMPOSITION

BACKGROUND

In the adhesive industry, olefin-based polymer is formulated with tackifier and wax for the production of hot melt adhesive (HMA) with adhesion properties suitable for packaging adhesive and other applications. Attempts have been made by formulating HMAs with ethylene-vinyl acetate (EVA) copolymer. However, while HMA containing EVA copolymer can exhibit sufficient high temperature adhesion performance (such as heat stress), the HMA exhibits poor low temperature adhesion performance (such as fiber tear).

The art recognizes the need to expand the variety of olefin-based polymers useful in HMA formulations offering suitable adhesive performance. The art also recognizes the need to expand the variety of olefin-based polymers useful in HMA formulations offering suitable adhesive performance, such as for difficult to bond substrates such as cardboard, at both low temperatures and high temperatures.

SUMMARY

The present disclosure provides a composition. The composition contains (A) an ethylene/α-olefin copolymer having a density from 0.855 g/cc to 0.895 g/cc and a melt viscosity, at 177° C., from 5,000 mPa·s to 50,000 mPa·s; (B) a functionalized propylene-based polymer containing from 1 wt % to 10 wt % functional groups, the functionalized propylene-based polymer having a melt viscosity, at 190° C., from greater than 10,000 mPa·s to 50,000 mPa·s and a weight average molecular weight, Mw, greater than 30,000 g/mol; (C) a tackifier; and (D) a wax.

BRIEF DESCRIPTION OF THE DRAWINGS

FIG. 1 is a schematic representation of a heat stress sample holder in accordance with an embodiment of the present disclosure.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "adhesive composition" is a mixture of components that is capable of joining substrates of interest together under an application of heat and/or pressure. A nonlimiting example of a suitable adhesive composition is a hot melt adhesive (HMA) composition. A "hot melt adhesive (HMA) composition" is a mixture of components that is capable of joining substrates of interest together under the application of heat, or more typically, the application of heat and pressure.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

Test Methods

Acid value (or acid number) is measured in accordance with ASTM D 1386/7. Acid value is a measure of the amount of unreacted fatty acid present in a substance. The acid value is the number of milligrams of potassium hydroxide required for the neutralization of free fatty acids present in one gram of a substance (e.g., the wax). Units for acid value are mg KOH/g.

Density is measured in accordance with ASTM D792, Method B. The result is recorded in grams (g) per cubic centimeter (g/cc or g/cm$^3$).

Drop point is measured in accordance with ASTM D3954.

Fiber Tear (%) of compositions is determined according to a standardized method using biaxially oriented polypropylene (BOPP) laminated cardboard. The sample composition is heated to 177° C. and a bead of sample composition (applied at a weight of 2.1 gram per meter) is applied on to a cardboard coupon (25.4 mm×76.2 mm) by drawing the sample composition lengthwise down the cardboard coupon with a spatula or hot melt applicator, and a second coupon is quickly placed (within 1 second) on top of the sample composition, with a pressure of 2.5 bar (250 kPa) for 10 seconds to hold the bond in place. Samples are conditioned for 24 hours at room temperature and 54% relative humidity. Immediately after conditioning, samples (n=5) are pulled apart by inserting the blade of a spatula under one corner to fold up the corner. The sample is then placed on a horizontal surface, with the side having the folded corner facing up. With the sample held as near as possible to a heating or cooling source set at the test temperature, the folded corner is manually pulled as rapidly as possible at approximately a 45-90° angle, relative to each coupon's lengthwise axis, to tear the adhesive bond. The percent of torn fiber (fiber tear) is estimated in 25% increments (that is, 0%, 25%, 50%, 75%, and 100%), and the average is recorded.

Heat stress resistance (heat stress) is measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction) having dimensions of 2 inches (50.8 mm)×3³⁄₁₆ in (81 mm) and 2 in (50.8 mm)×5½ in (139.7 mm) are bonded by applying 0.00014 lb/in of the composition (about 0.12-0.13 gram) using an Inatec Bond Tester (application temperature 177° C.). This tester is used to compress the coupons at a constant pressure, and without a further application of heat. The composition is applied perpendicular to the flutes in the center of the shorter coupon and the coupons are bonded such that the composition was ¾ in (19 mm) from one end of the long coupon. Five replicates are made for each composition. Each coupon is stored for 24 hours, at 22° C.-23° C., and 50% relative humidity. As shown in FIG. 1, samples (10) are then loaded into a sample holder (12), with the short coupon end aligned with the edge of the sample holder (12), as shown in FIG. 1. The samples (10) are held in place with a wide plate (14) of the sample holder (12) (10), and the plate (14) is secured by wingnuts (16) to the sample holder (12). A "200 g" weight (18) is attached to the coupon (20), at a distance of 3.94 in (100 mm) from the bond. The weight (18) is secured by placing the peg attached to the weight into a hole made in the end of the longer coupon. The sample holder (12), containing the coupon (20) and the attached weight (18), is then placed into a convection oven (not shown), equilibrated at a set temperature, and remained in the oven for 24 hours. At the end of the 24 hours, if at least 80% of the bonds (i.e., 4 bonds) do not fail, then the sample is considered to have passed heat resistance testing at the test temperature. The oven temperature is varied, until the maximum passing heat stress resistance (temperature) is determined. All new bonded coupon samples are used for each test temperature. Results are reported as heat stress temperature (° C.).

Melt index (MI) is measured in accordance with ASTM D1238, Condition 190° C./2.16 kilogram (kg) weight, and is reported in grams eluted per 10 minutes (g/10 min).

Melt viscosity is measured in accordance with ASTM D 3236 using a Brookfield Viscometer (Model DV0III, version 3), and a SC-31 hot-melt viscometer spindle, at 177° C. for the ethylene-based copolymer; at 177° C. for the composition; at 190° C. for the functionalized propylene-based polymer; at 135° C. for the ethylene-based polymer wax; and at 190° C. for the propylene-based polymer wax. The sample is poured into an aluminum disposable tube-shaped chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams) is heated to the required temperature until the melted sample was one inch below the top of the sample chamber. The viscometer apparatus is lowered, and the spindle submerged into the middle of the sample chamber, wherein the spindle does not touch the sides of the chamber. Lowering is continued, until the brackets on the viscometer align on the Thermosel. The viscometer is turned on, and set to operate at a steady shear rate, which leads to a torque reading in the range of 40 to 60 percent of the total torque capacity, based on the rpm output of the viscometer. Readings are taken every minute for 15 minutes, or until the values stabilize, at which point, a final reading is recorded.

Ring-and-ball softening point is measured using a Mettler Toledo FP900 Thermosystem according to ASTM E28.

Vicat softening point is measured in accordance with ASTM D 1525.

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min was used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, $T_m$, and extrapolated onset of crystallization, Tc.

Melting point, $T_m$, is determined from the DSC heating curve by first drawing the baseline between the start and end of the melting transition. A tangent line is then drawn to the data on the low temperature side of the melting peak. Where this line intersects the baseline is the extrapolated onset of melting ($T_m$). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature, $T_g$, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the $T_g$ region. The temperature at which the sample heat capacity is half-way between these baselines is the $T_g$.

Peel Adhesion Failure Temperature (PAFT) and Shear Adhesion Failure Temperature (SAFT)

Peel adhesion failure temperature (PAFT) is tested according to ASTM D 4498 with a 100 gram weight using a Cheminstruments OSI-8 programmable oven in the peel mode. The tests are started at 40° C. and the temperature is increased at an average rate of 0.5° C./minute.

Shear Adhesion Failure Temperature (SAFT) is measured according to ASTM D4498 with a 500 gram weight using a Cheminstruments OSI-8 programmable oven in the shear mode. The tests are started at 40° C. and the oven temperature is ramped at an average rate of 0.5° C./minute. The temperature at which the specimen failed is recorded.

Samples for PAFT and SAFT testing are prepared using two sheets of 60 g/m² Kraft paper, each of 6×12 in (152×305 mm) dimensions. On the bottom sheet, lengthwise and separated by a gap of 1 in (25 mm), are adhered in parallel fashion two 1.75 in or 2 in (45 mm or 51 mm) wide strips of a one sided, pressure-sensitive tape such as masking tape. The composition sample to be tested is heated to 177° C. (350° F.) and drizzled in an even manner down the center of the gap formed between the tape strips. Then, before the composition can unduly thicken, two glass rods, one rod riding immediately upon the tapes and shimmed on each side of the gap with a strip of the same tape followed by the second rod and (between the two rods) the second sheet of paper, are slid down the length of the sheets. This is done in a fashion such that the first rod evenly spreads the composition in the gap between the tape strips and the second rod evenly compress the second sheet over the top of the gap and on top of the tape strips. Thus, a single 1 inch (25.4 mm) wide strip of sample composition is created between the two tape strips, and bonding the paper sheets. The sheets so bonded are cut crosswise into strips of width 1 inch (25.4 mm) and length of 3 inches (76.2 mm), each strip having a 1×1 in (25×25 mm) adhesive sample bond in the center. The strips are conditioned for 24 hours at room temperature (23° C.) and 54% relative humidity. The strips are then employed in the PAFT and SAFT testing, as desired. Two specimens from each compositions sample are tested, and the average failure temperature for PAFT and SAFT is recorded.

Gel Permeation Chromatography (GPC)

Weight average molecular weight (Mw) and number average molecular weight (Mn) are measured using a gel permeation chromatography (GPC) system.

The "Z average molecular weight" (Mz) is the third moment average molar mass. Mz is measured using a gel permeation chromatography (GPC) system.

Mw, Mn, and Mz are calculated according to the following Equations (1)-(3):

$$\overline{Mn} = \frac{\sum_{i} Wf_i}{\sum_{i}(Wf_i/M_i)} \quad \text{Equation (1)}$$

$$\overline{Mw} = \frac{\sum_{i}(Wf_i * M_i)}{\sum_{i} Wf_i} \quad \text{Equation (2)}$$

$$\overline{Mz} = \frac{\sum_{i}(Wf_i * M_i^2)}{\sum_{i}(Wf_i * M_i)} \quad \text{Equation (3)}$$

wherein Wfi is the weight fraction of the i-th component and Mi is the molecular weight of the i-th component. Polydispersity is calculated in accordance with the following Equation (4):

$$PDI = \overline{M_w}/\overline{M_n} \quad \text{Equation (4)}$$

DETAILED DESCRIPTION

The present disclosure provides a composition. The composition contains (A) an ethylene/α-olefin copolymer having a density from 0.855 g/cc to 0.895 g/cc and a melt viscosity, at 177° C., from 5,000 mPa·s to 50,000 mPa·s; (B) a functionalized propylene-based polymer containing from 1 wt % to 10 wt % functional groups, the functionalized propylene-based polymer having a melt viscosity, at 190° C., from greater than 10,000 mPa·s to 50,000 mPa·s and a weight average molecular weight, Mw, greater than 30,000 g/mol; (C) a tackifier; and (D) a wax.

In an embodiment, the composition is an adhesive composition.

A. Ethylene/α-olefin Copolymer

The composition contains an ethylene/α-olefin copolymer. The ethylene/α-olefin copolymer has a density from 0.855 g/cc to 0.895 g/cc and a melt viscosity, at 177° C., from 5,000 mPa·s to 50,000 mPa·s.

Nonlimiting examples of suitable ethylene/α-olefin copolymer include LDPE and linear polyethylene. Nonlimiting examples of linear polyethylene include LLDPE, ULDPE, VLDPE, EPE, ethylene/α-olefin multi-block copolymers (also known as OBC), m-LLDPE, substantially linear, or linear, plastomers/elastomers (POP), and combinations thereof. In an embodiment, the ethylene/α-olefin copolymer is a POP.

In an embodiment, the ethylene/α-olefin copolymer contains, consists essentially of, or consists of (i) ethylene and (ii) $C_3$-$C_8$ α-olefin, or $C_4$-$C_8$ α-olefin, or $C_6$-$C_8$ α-olefin comonomer. In an embodiment, the α-olefin comonomer is selected from hexene and octene. In a further embodiment, the α-olefin is octene.

In an embodiment, the ethylene/α-olefin copolymer is ethylene/octene copolymer.

In an embodiment, the ethylene/α-olefin copolymer contains (i) ethylene and (ii) from 20 wt % to 36 wt %, or 40 wt % $C_6$-$C_8$ α-olefin comonomer, based on the total weight of the ethylene/α-olefin copolymer. In an embodiment, the ethylene/α-olefin copolymer contains (i) from 60 wt %, or 64 wt % to 80 wt % units derived from ethylene; and (ii) a reciprocal amount of units derived from $C_6$-$C_8$ α-olefin comonomer, or from 20 wt % to 36 wt %, or 40 wt % units derived from $C_6$-$C_8$ α-olefin comonomer, based on the total weight of the ethylene/α-olefin copolymer.

The ethylene/α-olefin copolymer has a density from 0.855 g/cc to 0.895 g/cc. In an embodiment, the ethylene/α-olefin copolymer has a density from 0.855 g/cc, or 0.860 g/cc, or 0.865 g/cc, or 0.870 g/cc to 0.875 g/cc, or 0.880 g/cc, or 0.885 g/cc, or 0.890 g/cc, or 0.895 g/cc. In another embodiment, the ethylene/α-olefin copolymer has a density from 0.870 g/cc to 0.880 g/cc, or from 0.870 g/cc to 0.875 g/cc.

The ethylene/α-olefin copolymer has a melt viscosity, at 177° C., from 5,000 mPa·s to 50,000 mPa·s. In an embodiment, the ethylene/α-olefin copolymer has a melt viscosity, at 177° C. from 5,000 mPa·s, or 10,000 mPa·s, or 15,000 mPa·s, or 17,000 mPa·s to 20,000 mPa·s, or 25,000 mPa·s, or 30,000 mPa·s, or 40,000 mPa·s, or 50,000 mPa·s. In another embodiment, the ethylene/α-olefin copolymer has a melt viscosity, at 177° C. from 10,000 mPa·s to 20,000 mPa·s, or from 15,000 mPa·s to 20,000 mPa·s.

In an embodiment, the ethylene/α-olefin copolymer has a glass transition temperature, Tg, from −60° C., or −58° C. to −55° C., or −50° C., or −40° C., or −20° C. In an embodiment, the ethylene/α-olefin copolymer has a melting temperature, Tm, from 40° C., or 50° C., or 55° C., or 60° C., or 65° C., or 70° C. to 75° C., or 77° C., or 80° C., or 85° C., or 90° C., or 100° C., or 110° C., or 120° C. In an embodiment, the ethylene/α-olefin copolymer has a crystallization temperature, Tc, from 50° C., or 55° C., or 60° C., or 65° C., or 70° C. to 75° C., or 80° C., or 90° C.

In an embodiment, the ethylene/α-olefin copolymer is an ethylene/octene copolymer having (i) a density from 0.855 g/cc to 0.895 g/cc, or from 0.870 g/cc to 0.880 g/cc, or from 0.870 g/cc to 0.875 g/cc; and (ii) a melt viscosity, at 177° C., from 5,000 mPa·s to 50,000 mPa·s, or from 10,000 mPa·s to 20,000 mPa·s, or from 15,000 mPa·s to 20,000 mPa·s. In an embodiment, the ethylene/octene copolymer consists of (i) ethylene and (ii) from 20 wt % to 36 wt %, or 40 wt % octene comonomer, based on the total weight of the ethylene/octene copolymer. In a further embodiment, the ethylene/octene copolymer has one, some, or all of the following properties: (i) a Tg from −60° C. to −20° C., or from −58° C. to −55° C.; and/or (ii) a Tm from 40° C. to 120° C., or from 70° C. to 75° C.; and/or (iii) a Tc from 50° C. to 90° C., or from 50° C. to 75° C., or from 70° C. to 75° C.

The ethylene/α-olefin copolymer may comprise two or more embodiments disclosed herein.

B. Functionalized Propylene-Based Polymer

The composition contains a functionalized propylene-based polymer. The functionalized propylene-based polymer contains from 1 wt % to 10 wt % functional groups. The functionalized propylene-based polymer has a melt viscosity, at 190° C., from greater than 10,000 mPa·s to 50,000 mPa·s and a weight average molecular weight, Mw, greater than 30,000 g/mol.

A "functionalized propylene-based polymer" is a propylene-based polymer with a carboxylic acid-based moiety bonded to the propylene-based polymer chain (for example, a carboxylic acid-based moiety grafted to a propylene/α-olefin interpolymer chain). A "carboxylic acid-based moiety" is a compound that contains a carboxyl group (—COOH) or a derivative thereof. Nonlimiting examples of suitable carboxylic acid-based moieties include carboxylic acids and carboxylic acid anhydrides. Nonlimiting examples of suitable carboxylic acids and carboxylic acid anhydrides that can be grafted onto the propylene-based polymer include maleic acid, fumaric acid, itaconic acid, acrylic acid, methacrylic acid, crotonic acid, maleic anhydride (MAH), and itaconic anhydride.

The base propylene-based polymer of the functionalized propylene-based polymer may be any propylene-based polymer disclosed herein. Nonlimiting examples of suitable base propylene-based polymer include propylene homopolymer, propylene/α-olefin interpolymer, and propylene/α-olefin copolymer. Nonlimiting examples of suitable α-olefins include $C_2$ α-olefins, $C_4$-$C_{20}$ α-olefins, or $C_4$-$C_{10}$ α-olefins, or $C_4$-$C_8$ α-olefins. Representative α-olefins include ethylene, 1-butene, 1-pentene, 1-hexene, 1-heptene and 1-octene. In an embodiment, the base propylene-based polymer does not contain an aromatic comonomer polymerized therein. In an embodiment, the base propylene-based polymer is a propylene/1-octene copolymer. In another embodiment, the base propylene-based polymer is a propylene/ethylene copolymer.

In an embodiment, the base propylene-based polymer contains greater than 50 wt % units derived from propylene, or from 51 wt %, or 55 wt %, or 60 wt % to 70 wt %, or 80 wt %, or 90 wt %, or 95 wt %, or 99 wt %, or 100 wt % units derived from propylene; and a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the total weight of the base propylene-based polymer.

In an embodiment, the functionalized propylene-based polymer is a functionalized propylene/α-olefin copolymer containing, consisting essentially of, or consisting of (i) propylene, (ii) $C_2$ or $C_4$-$C_8$ α-olefin comonomer, and (iii) functional groups. In an embodiment, the α-olefin comonomer is selected from ethylene, butene, hexene, and octene. In a further embodiment, the α-olefin is ethylene.

In an embodiment, the functionalized propylene-based polymer is a maleic anhydride-grafted propylene-based polymer ("MAH-g-PP").

In an embodiment, the functionalized propylene-based polymer is a functionalized propylene/α-olefin copolymer. In a further embodiment, the functionalized propylene/α-olefin copolymer is a maleic-anhydride-grafted propylene/α-olefin copolymer (a "MAH-g-propylene/α-olefin copolymer"). A nonlimiting example of a suitable MAH-g-propylene/α-olefin copolymer is DuPont FUSABOND P353, available from the Dow Chemical Company.

The functionalized propylene-based polymer contains from 1 wt % to 10 wt % functional groups, based on the total weight of the functionalized propylene-based polymer. A "functional group" is a carboxylic acid-based moiety. In an embodiment, the functionalized propylene-based polymer contains from 1 wt % to 2 wt %, or 5 wt %, or 8 wt %, or 10 wt % functional groups, based on the total weight of the functionalized propylene-based polymer. In a further embodiment, the functionalized propylene-based polymer contains from 1 wt % to 5 wt %, or from 1 wt % to 2 wt % functional groups, based on the total weight of the functionalized propylene-based polymer.

The functionalized propylene-based polymer has a melt viscosity, at 190° C., from greater than 10,000 mPa·s to 50,000 mPa·s. In an embodiment, the functionalized propylene-based polymer has a melt viscosity, at 190° C., from 10,000 mPa·s, or 12,000 mPa·s, or 15,000 mPa·s to 18,000 mPa·s, or 20,000 mPa·s, or 30,000 mPa·s, or 40,000 mPa·s, or 50,000 mPa·s. In a further embodiment, the functionalized propylene-based polymer has a melt viscosity, at 190° C., from 10,000 mPa·s to 30,000 mPa·s, or from 10,000 mPa·s to 20,000 mPa·s, or from 15,000 mPa·s to 20,000 mPa·s.

The functionalized propylene-based polymer has a weight average molecular weight, Mw, greater than 30,000 g/mol. In an embodiment, the functionalized propylene-based polymer has a Mw from 31,000 g/mol, or 35,000 g/mol to 40,000 g/mol, or 50,000 g/mol, or 70,000 g/mol. In a further embodiment, the functionalized propylene-based polymer has a Mw from 31,000 g/mol to 70,000 g/mol, or from 31,000 g/mol to 50,000 g/mol, or from 35,000 g/mol to 40,000 g/mol.

In an embodiment, the functionalized propylene-based polymer has a number average molecular weight, Mn, from 10,000 g/mol, or 12,000 g/mol, or 14,000 g/mol to 15,000 g/mol, or 18,000 g/mol, or 20,000 g/mol, or 30,000 g/mol; or from 10,000 g/mol to 30,000 g/mol, or from 10,000 g/mol to 20,000 g/mol, or from 14,000 g/mol to 15,000 g/mol.

In an embodiment, the functionalized propylene-based polymer has a Mw/Mn from 2.0, or 2.2, or 2.4 to 2.5, or 2.6, or 2.8, or 2.9, or 3.0; or from 2.0 to 3.0, or from 2.4 to 2.6.

In an embodiment, the functionalized propylene-based polymer has a Z average molecular weight, Mz, from 50,000 g/mol, or 55,000 g/mol, or 60,000 g/mol to 65,000 g/mol, or 70,000 g/mol, or 80,000 g/mol; or from 50,000 g/mol to 80,000 g/mol, or from 60,000 g/mol to 65,000 g/mol.

In an embodiment, the functionalized propylene-based polymer has a melt index (MI) from 100 g/10 min, or 200 g/10 min, or 400 g/10 min to 500 g/10 min, or 1000 g/10 min; or from 100 g/10 min to 1000 g/10 min, or from 200 g/10 min to 500 g/10 min; or from 400 g/10 min to 500 g/10 min.

In an embodiment, the functionalized propylene-based polymer has a density from 0.890 g/cc, or 0.895 g/cc, or 0.900 g/cc to 0.905 g/cc, or 0.910 g/cc, or 0.915 g/cc; or from 0.890 g/cc to 0.915 g/cc, or from 0.900 g/cc to 0.905 g/cc.

In an embodiment, the functionalized propylene-based polymer has a melting temperature, Tm, from 120° C., or 125° C., or 130° C., or 135° C. to 140° C., or 145° C., or 150° C., or 160° C.; or from 120° C. to 160° C., or from 135° C. to 140° C. In an embodiment, the functionalized propylene-based polymer has a Vicat softening point from 100° C., or 105° C., or 110° C., or 112° C. to 115° C., or 120° C., or 130° C.

In an embodiment, the functionalized propylene-based polymer is a MAH-g-propylene/α-olefin copolymer containing, consisting essentially of, or consisting of (i) propylene, (ii) $C_2$ or $C_4$-$C_8$ α-olefin comonomer, and (iii) from 1 wt % to 10 wt %, or from 1 wt % to 2 wt % MAH, based on the total weight of the MAH-g-propylene/α-olefin copolymer. The MAH-g-propylene/α-olefin copolymer has (i) a melt viscosity, at 190° C., from greater than 10,000 mPa·s to 50,000 mPa·s, or from 10,000 mPa·s to 20,000 mPa·s, or from 15,000 mPa·s to 20,000 mPa·s; and (ii) a weight average molecular weight, Mw, greater than 30,000 g/mol, or from 31,000 g/mol to 70,000 g/mol, or from 35,000 g/mol to 40,000 g/mol. In a further embodiment, the MAH-g-propylene/α-olefin copolymer has one, some, or all of the following properties: (i) a Mn from 10,000 g/mol to 30,000 g/mol, or from 14,000 g/mol to 15,000 g/mol; and/or (ii) a Mw/Mn from 2.0 to 3.0, or from 2.4 to 2.6; and/or (iii) a Mz from 50,000 g/mol to 80,000 g/mol, or from 60,000 g/mol to 65,000 g/mol; and/or (iv) a MI from 100 g/10 min to 1000 g/10 min, or from 200 g/10 min to 500 g/10 min, or from 400 g/10 min to 500 g/10 min; and/or (v) a density from 0.890 g/cc to 0.915 g/cc, or from 0.900 g/cc to 0.905 g/cc; and/or (vi) a Tm from 120° C. to 160° C., or from 135° C. to 140° C.; and/or (vii) a Vicat softening point from 100° C. to 130° C., or from 110° C. to 115° C.

The functionalized propylene-based polymer may comprise two or more embodiments disclosed herein.

C. Tackifier

The composition includes a tackifier. The tackifier may modify the properties of the composition, such as viscoelastic properties (e.g., tan delta), rheological properties (e.g., viscosity), tackiness (e.g., ability to stick), pressure sensitivity, and wetting property. In some embodiments, the tackifier is used to improve the tackiness of the composition. In particular embodiments, the tackifier is used to wet out adherent surfaces and/or improve the adhesion to the adherent surfaces.

Tackifiers suitable for the composition disclosed herein can be solids, semi-solids, or liquids at room temperature. Non-limiting examples of suitable tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; (8) aromatic modified aliphatic or cycloaliphatic hydrocarbon resins and the hydrogenated derivatives thereof; and (9) combinations thereof.

In an embodiment, the tackifier includes aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70° C., or 100° C. to 130° C., or 150° C. They are also available with differing levels of hydrogenation, or saturation, which is another commonly used term. Nonlimiting examples of suitable tackifying resins include Eastotac™ H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of 140° C. Other nonlimiting examples of suitable tackifying resins include Escorez™ 5300, 5400, and 5637, partially hydrogenated aliphatic petroleum hydrocarbon resins, and Escorez™ 5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

In an embodiment, the tackifier includes aliphatic hydrocarbon resins such as resins resulting from the polymerization of monomers consisting of olefins and diolefins (e.g., ESCOREZ™ 1310LC, ESCOREZ™ 2596 from ExxonMobil Chemical Company, Houston, Tex. or PICCOTAC™ 1095, PICCOTAC™ 9095 from Eastman Chemical Company, Kingsport, Tenn.) and the hydrogenated derivatives thereof; alicyclic petroleum hydrocarbon resins and the hydrogenated derivatives thereof (e.g., ESCOREZ™ 5300 and 5400 series from ExxonMobil Chemical Company; EASTOTAC™ resins from Eastman Chemical Company). In some embodiments, the tackifiers include hydrogenated cyclic hydrocarbon resins (e.g., REGALREZ™ and REGALITE™ resins from Eastman Chemical Company).

In an embodiment, the tackifier is a cycloaliphatic hydrocarbon resin. In a further embodiment, the tackifier is a hydrogenated cycloaliphatic hydrocarbon resin. A nonlimiting example of a suitable hydrogenated cycloaliphatic hydrocarbon resin is ESCOREZ™ 5400, available from Exxon.

In an embodiment, the tackifier has a Ring and Ball softening point from 95° C., or 97° C., or 100° C. to 105° C., or 110° C., or 115° C., or 120° C., or 130° C., or 140° C., or 150° C.

In an embodiment, the tackifier is a hydrogenated hydrocarbon resin; and the tackifier has a Ring and Ball softening point from 95° C. to 150° C., or from 95° C. to 110° C., or from 100° C. to 105° C.

The tackifier may comprise two or more embodiments disclosed herein.

D. Wax

The composition includes a wax. The wax may be used to reduce the melt viscosity of the composition and to adjust the open time and set time of the composition. Nonlimiting examples of suitable wax include ethylene-based polymer wax, propylene-based polymer wax, paraffin wax, microcrystalline wax, by-product polyethylene wax, Fischer-Tropsch wax, oxidized Fischer-Tropsch wax, functionalized wax such as hydroxy stearamide wax and fatty amide wax, and combinations thereof.

Ethylene-Based Polymer Wax

In an embodiment, the wax is an ethylene-based polymer wax.

An "ethylene-based polymer wax" is an ethylene-based polymer having a melt viscosity, at 135° C., that is less than, or equal to ($\leq$) 1,000 mPa·s, or $\leq$500 mPa·s, or $\leq$100 mPa·s, or $\leq$50 mPa·s, or $\leq$10 mPa·s. The ethylene-based polymer wax is composed of a majority amount (i.e., greater than 50 wt %) of polymerized ethylene monomer and optional α-olefin comonomer.

In an embodiment, the ethylene-based polymer wax is selected from a high density, low molecular weight polyethylene wax, a by-product polyethylene wax, a Fischer-Tropsch wax containing an ethylene-based polymer, oxidized Fischer-Tropsch waxes containing an ethylene-based polymer, functionalized polyethylene waxes, and combinations thereof.

In an embodiment, the ethylene-based polymer wax is not functionalized.

In an embodiment, the ethylene-based polymer wax is a Fischer-Tropsch wax containing an ethylene-based polymer. Nonlimiting examples of Fischer-Tropsch waxes containing ethylene-based polymer include SASOL™ waxes such as SASOLWAX™ H1, available from the Sasol Wax Company.

In an embodiment, the ethylene-based polymer wax has a melt viscosity, at 135° C., from 1 mPa·s, or 2 mPa·s, or 5 mPa·s, or 6 mPa·s, or 7 mPa·s, or 8 mPa·s to 10 mPa·s, or 20 mPa·s, or 50 mPa·s, or 100 mPa·s, or 200 mPa·s, or 300 mPa·s, or 400 mPa·s, or 500 mPa·s, or 750 mPa·s, or less than 1,000 mPa·s. In another embodiment, the ethylene-based polymer wax has a melt viscosity, at 135° C., from 1 mPa·s to less than 1,000 mPa·s, or from 1 mPa·s to 100 mPa·s, or from 1 mPa·s to 50 mPa·s, or from 1 mPa·s to 10 mPa·s, or from 5 mPa·s to 10 mPa·s.

In an embodiment, the ethylene-based polymer wax has a density from 0.880 g/cc, or 0.885 g/cc, or 0.890 g/cc, or 0.895 g/cc, or 0.900 g/cc, or 0.910 g/cc to 0.920 g/cc, or 0.930 g/cc, or 0.940 g/cc, or 0.950 g/cc, or 0.960 g/cc, or 0.970 g/cc. In another embodiment, the ethylene-based polymer wax has a density from 0.880 g/cc to 0.970 g/cc, or from 0.900 g/cc to 0.960 g/cc, or from 0.920 g/cc to 0.950 g/cc, or from 0.940 g/cc to 0.950 g/cc, or from 0.895 g/cc to 0.905 g/cc.

In an embodiment, the ethylene-based polymer wax has one, some, or all of the following properties: (i) a melt viscosity, at 135° C., from 1 mPa·s to less than 1,000 mPa·s, or from 5 mPa·s to 10 mPa·s; and/or (ii) a density from 0.880 g/cc to 0.970 g/cc, or from 0.940 g/cc to 0.950 g/cc; and/or (iii) a melting point greater than 80° C., or greater than 90° C.; and/or (iv) an acid value from 0 mg KOH/g to 0.1 mg KOH/g, or 0.5 mg KOH/g, or 1.0 mg KOH/g; and/or (v) a drop point from 100° C. to 120° C., or from 110° C. to 115° C. In a further embodiment, the ethylene-based polymer wax is a Fischer-Tropsch wax.

The ethylene-based polymer wax may comprise two or more embodiments disclosed herein.

Propylene-Based Polymer Wax

In an embodiment, the wax is a propylene-based polymer wax.

A "propylene-based polymer wax" is a propylene-based polymer having a melt viscosity, at 190° C., that is less than, or equal to ($\leq$) 1,000 mPa·s, or $\leq$500 mPa·s, or $\leq$100 mPa·s, or $\leq$50 mPa·s. The propylene-based polymer wax is composed of a majority amount (i.e., greater than 50 wt %) of polymerized propylene monomer and optional α-olefin comonomer. The propylene-based polymer wax may be produced by way of Ziegler-Natta catalyst polymerization or metallocene catalyst polymerization yielding a Ziegler-Natta catalyzed propylene-based polymer wax or a metallocene-catalyzed propylene-based polymer wax, respectively.

In an embodiment, the propylene-based polymer wax is a propylene homopolymer.

In an embodiment, the propylene-based polymer wax is a propylene homopolymer, and excludes functionalized wax, polyethylene wax, Fischer-Tropsch wax, animal wax, plant wax, petroleum-derived wax (paraffin wax, microcrystalline wax), and montan wax.

Nonlimiting examples of suitable propylene-based polymer wax are waxes sold under the tradename LICOCENE, available from Clariant.

In an embodiment, the propylene-based polymer wax has one or both of the following properties: (i) a density from 0.89 g/cc, or 0.90 g/cc to 0.91 g/cc; and/or (ii) a melt viscosity, at 190° C., from 40 mPa·s, or 50 mPa·s, or 60 mPa·s to 65 mPa·s, or 70 mPa·s, or 75 mPa·s, or 80 mPa·s, or 90 mPa·s, or 100 mPa·s.

The propylene-based polymer wax may comprise two or more embodiments disclosed herein.

The wax may comprise two or more embodiments disclosed herein.

E. Optional Additive

In an embodiment, the composition contains (A) the ethylene/α-olefin copolymer; (B) the functionalized propylene-based polymer; (C) the tackifier; (D) the wax; and (E) an optional additive.

Nonlimiting examples of suitable additives include plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, water, and combinations thereof.

In an embodiment, the composition includes an antioxidant. The antioxidant protects the composition from degradation caused by reaction with oxygen induced by such things as heat, light, or residual catalyst from the raw materials such as the tackifying resin. Suitable antioxidants include high molecular weight hindered phenols and multifunctional phenols such as sulfur and phosphorous-containing phenol. Representative hindered phenols include; 1,3,5-trimethyl-2,4,6-tris-(3,5-di-tert-butyl-4-hydroxybenzyl)-benzene; pentaerythrityltetrakis-3(3,5-d i-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. Such antioxidants are commercially available from BASF and include Irganox™ 565, 1010, 1076 and 1726, which are hindered phenols. These are primary antioxidants act as radical scavengers and may be used alone or in combination with other antioxidants such as phosphite antioxidants like Irgafos™ 168, available from BASF. Phosphite antioxidant are considered secondary antioxidant and are not generally used alone. These are primarily used as peroxide decomposers. Other available antioxidants are Cyanox™ LTDP, available from Solvay, and Ethanox™ 330, available from SI Group. Many such antioxidants are available either to be used alone or in combination with other such antioxidants.

In an embodiment, the composition includes an antioxidant that is a hindered phenol antioxidant. In a further embodiment, the hindered phenol antioxidant is pentaerythrityl tetrakis-3(3,5-di-tert-butyl-4-hydroxyphenyl)-propionate, commercially available as IRGANOX™ 1010 from BASF.

The optional additive may comprise two or more embodiments disclosed herein.

F. Composition

The present composition contains (A) the ethylene/α-olefin copolymer; (B) the functionalized propylene-based polymer; (C) the tackifier; and (D) the wax. In an embodiment, the composition contains (E) the optional additive.

In an embodiment, the composition is an adhesive composition, and further a hot melt adhesive (HMA) composition.

In an embodiment, the composition contains from 20 wt %, or 25 wt %, or 30 wt % to 35 wt %, or 40 wt %, or 45 wt %, or 50 wt % ethylene/α-olefin copolymer, based on the total weight of the composition. In another embodiment, the composition contains from 20 wt % to 50 wt %, or from 25 wt % to 40 wt %, or from 30 wt % to 35 wt % ethylene/α-olefin copolymer, based on the total weight of the composition.

In an embodiment, the composition contains from 1 wt %, or 2 wt %, or 5 wt % to 10 wt %, or 15 wt % functionalized propylene-based polymer, based on the total weight of the composition. In another embodiment, the composition contains from 1 wt % to 15 wt %, or from 5 wt % to 15 wt %, or from 5 wt % to 10 wt % functionalized propylene-based polymer, based on the total weight of the composition.

In an embodiment, the composition contains from 20 wt %, or 25 wt %, or 30 wt %, or 35 wt % to 40 wt %, or 45 wt %, or 50 wt %, or 55 wt %, or 60 wt % tackifier, based on the total weight of the composition. In another embodiment, the composition contains from 20 wt % to 60 wt %, or from 20 wt % to 50 wt %, or from 35 wt % to 40 wt % tackifier, based on the total weight of the composition.

In an embodiment, the composition contains from 10 wt %, or 15 wt %, or 20 wt % to 25 wt %, or 30 wt %, or 40 wt % wax, based on the total weight of the composition. In another embodiment, the composition contains from 1 wt % to 40 wt %, or from 15 wt % to 30 wt %, or from 20 wt % to 25 wt % wax, based on the total weight of the composition.

In an embodiment, the composition contains from 0 wt %, or 0.1 wt %, or 0.2 wt %, or 0.3 wt %, or 0.4 wt % to 0.5 wt %, or 1.0 wt %, or 2.0 wt %, or 3.0 wt % of one of more optional additive, based on total weight of the composition.

In an embodiment, the composition contains (A) from 20 wt % to 50 wt %, or from 25 wt % to 40 wt %, or from 30 wt % to 35 wt % ethylene/α-olefin copolymer; (B) from 1 wt % to 15 wt %, or from 5 wt % to 15 wt %, or from 5 wt % to 10 wt % functionalized propylene-based polymer; (C) from 20 wt % to 60 wt %, or from 20 wt % to 50 wt %, or from 35 wt % to 40 wt % tackifier; (D) from 1 wt % to 40 wt %, or from 15 wt % to 30 wt %, or from 20 wt % to 25 wt % wax; and (E) from 0 wt % to 3 wt %, or from 0.1 wt % to 1.0 wt % of one of more optional additive, based on total weight of the composition.

In an embodiment, the (A) ethylene/α-olefin copolymer, the (B) functionalized propylene-based polymer, the (C) tackifier, and the (D) wax are the only polymeric components present in the composition. In other words, the composition is void of, or substantially void of, polymers that are compositionally, structurally, and/or physically distinct from the (A) ethylene/α-olefin copolymer, the (B) functionalized propylene-based polymer, the (C) tackifier, and the (D) wax.

In an embodiment, the composition, is void of, or substantially void of, functionalized ethylene-based polymer.

In an embodiment, the composition is void of, or substantially void of, amorphous polymer. An "amorphous polymer" is a polymeric compound that does not exhibit a melting point.

In an embodiment, the composition is void of, or substantially void of, ethylene-vinyl acetate (EVA) copolymer.

In an embodiment, the composition has a melt viscosity, at 177° C., from 500 mPa·s, or 800 mPa·s, or 1000 mPa·s, or 1200 mPa·s, or 1300 mPa·s, or 1400 mPa·s to 1500 mPa·s, or 1550 mPa·s, or 1600 mPa·s, or 1800 mPa·s, or 2000 mPa·s. In another embodiment, the composition has a melt viscosity, at 177° C., from 500 mPa·s to 2000 mPa·s, or from 800 mPa·s to 1800 mPa·s, or from 1000 mPa·s to 1600 mPa·s, or from 1400 mPa·s to 1550 mPa·s.

In an embodiment, the composition has a heat stress greater than, or equal to 60° C., or greater than 60° C. A high heat stress is advantageous in HMA applications because it indicates that the composition exhibits improved high temperature resistance, and enables articles (such as packages) formed with the composition to stay adhered in high temperature environments.

In an embodiment, the composition has a peel adhesion failure temperature (PAFT) greater than 60° C., or greater than 63° C. In another embodiment, the composition has a PAFT from 60° C. to 90° C., or from 63° C. to 85° C. A high PAFT is advantageous in HMA applications because it indicates that the composition exhibits improved high temperature resistance, and enables articles (such as packages) formed with the composition to stay adhered in high temperature environments.

In an embodiment, the composition has a shear adhesion failure temperature (SAFT) greater than 90° C. In another embodiment, the composition has a SAFT from 90° C. to 100° C., or from 92° C. to 100° C. A high SAFT is advantageous in HMA applications because it indicates that the composition exhibits improved high temperature resistance, and enables articles (such as packages) formed with the composition to stay adhered in high temperature environments.

In an embodiment, the composition has a fiber tear greater than 80%, or greater than 90%, or equal to or greater than 92% at a temperature range from −20° C. to 60° C. In another embodiment, the composition has a fiber tear from 80% to 100%, or from 90% to 100%, or from 92% to 100% at a temperature range from −20° C. to 60° C. A high fiber tear at a temperature range from −20° C. to 60° C. is advantageous in HMA applications because it indicates that articles (such as packages) formed with the composition will adhere over a wide range of temperatures.

In an embodiment, the composition has one, some, or all of the following properties: (i) a melt viscosity, at 177° C., from 500 mPa·s to 2000 mPa·s, or from 1000 mPa·s to 1550 mPa·s; and/or (ii) a heat stress greater than, or equal to 60° C., or greater than 60° C.; and/or (iii) a PAFT from 60° C. to 90° C., or from 63° C. to 85° C.; and/or (iv) a SAFT from 90° C. to 100° C., or from 92° C. to 100° C.; and/or (v) a fiber tear from 80% to 100%, or from 90% to 100%, or from 92% to 100% at a temperature range from −20° C. to 60° C.

In an embodiment, the composition is an adhesive composition, and further a hot melt adhesive (HMA) composition, and the composition contains, consists essentially of, or consists of:

(A) from 20 wt % to 50 wt %, or from 25 wt % to 40 wt %, or from 30 wt % to 35 wt % ethylene/α-olefin copolymer (such as an ethylene/octene copolymer) having (i) a density from 0.855 g/cc to 0.895 g/cc, or from 0.870 g/cc to 0.875 g/cc; and (ii) a melt viscosity, at 177° C., from 5,000 mPa·s to 50,000 mPa·s, or from 15,000 mPa·s to 20,000 mPa·s; and (iii) optionally, a Tg from −60° C. to −20° C., or from −58° C. to −55° C.; and/or (iv) optionally, a Tm from 40° C. to 120° C., or from 70° C. to 75° C.; and/or (v) optionally, a Tc from 50° C. to 90° C., or from 50° C. to 75° C.;

(B) from 1 wt % to 15 wt %, or from 5 wt % to 15 wt %, or from 5 wt % to 10 wt % functionalized propylene-based polymer that is a MAH-g-propylene/α-olefin copolymer containing, consisting essentially of, or consisting of (i) propylene, (ii) $C_2$ or $C_4$-$C_8$ α-olefin comonomer, and (iii) from 1 wt % to 10 wt %, or from 1 wt % to 2 wt % MAH, based on the total weight of the MAH-g-propylene/α-olefin copolymer; the MAH-g-propylene/α-olefin copolymer having (i) a melt viscosity, at 190° C., from greater than 10,000 mPa·s to 50,000 mPa·s, or from 15,000 mPa·s to 20,000 mPa·s; and (ii) a weight average molecular weight, Mw, greater than 30,000 g/mol, or from 31,000 g/mol to 70,000 g/mol, or from 35,000 g/mol to 40,000 g/mol; and (iii) optionally, a Mn from 10,000 g/mol to 30,000 g/mol, or from 14,000 g/mol to 15,000 g/mol; and/or (iv) optionally, a Mw/Mn from 2.0 to 3.0, or from 2.4 to 2.6; and/or (v) optionally, a Mz from 50,000 g/mol to 80,000 g/mol, or from 60,000 g/mol to 65,000 g/mol; and/or (vi) optionally, a MI from 100 g/10 min to 1000 g/10 min, or from 200 g/10 min to 500 g/10 min; and/or (vii) optionally, a density from 0.890 g/cc to 0.915 g/cc, or from 0.900 g/cc to 0.905 g/cc; and/or (viii) optionally, a Tm from 120° C. to 160° C., or from 135° C. to 140° C.; and/or (ix) optionally, a Vicat softening point from 100° C. to 130° C., or from 110° C. to 115° C.;

(C) from 20 wt % to 60 wt %, or from 20 wt % to 50 wt %, or from 35 wt % to 40 wt % tackifier (such as a hydrogenated hydrocarbon resin having a Ring and Ball softening point from 95° C. to 150° C., or from 100° C. to 105° C.);

(D) from 1 wt % to 40 wt %, or from 15 wt % to 30 wt %, or from 20 wt % to 25 wt % wax (such as an ethylene-based wax);

(E) from 0 wt % to 3 wt %, or from 0.1 wt % to 1.0 wt % of one of more optional additive (such as an antioxidant); and the composition has one, some, or all of the following properties: (i) a melt viscosity, at 177° C., from 500 mPa·s to 2000 mPa·s, or from 1000 mPa·s to 1550 mPa·s; and/or (ii) a heat stress greater than, or equal to 60° C., or greater than 60° C.; and/or (iii) a PAFT from 60° C. to 90° C., or from 63° C. to 85° C.; and/or (iv) a SAFT from 90° C. to 100° C., or from 92° C. to 100° C.; and/or (v) a fiber tear from 80% to 100%, or from 90% to 100%, or from 92% to 100% at a temperature range from −20° C. to 60° C.

It is understood that the sum of the components in each of the components and compositions disclosed herein, including the foregoing composition, yields 100 weight percent (wt %), based on the total weight of the respective component or composition.

It was surprisingly found that an HMA composition including (A) ethylene/α-olefin copolymer having a density from 0.855 g/cc to 0.895 g/cc and a melt viscosity, at 177° C., from 5,000 mPa·s to 50,000 mPa·s; (B) functionalized propylene-based polymer containing from 1 wt % to 10 wt % functional groups, the functionalized propylene-based polymer having a melt viscosity, at 190° C., from greater than 10,000 mPa·s to 50,000 mPa·s and a weight average molecular weight, Mw, greater than 30,000 g/mol; (C)

tackifier; and (D) wax unexpectedly exhibits the combination of (i) high fiber tear (i.e., equal to or greater than 80%) at a temperature range from −20° C. to 60° C., (ii) high heat stress (i.e., greater than, or equal to, 60° C.), and (iii) high PAFT (i.e., greater than 60° C.). The combination of high fiber tear at a temperature range from −20° C. to 60° C., high heat stress, and high PAFT is advantageous in HMA applications because the combination enables articles (such as packages) formed with the composition to adhere over a wide range of temperatures, and to stay adhered in high temperature environments.

The composition may comprise two or more embodiments disclosed herein.

G. Article

The present disclosure provides an article. The article includes at least one component formed from the present composition.

The composition can be any composition as disclosed above. In an embodiment, the composition is an HMA composition.

Nonlimiting examples of suitable articles include HMA bonded cardboard packaging boxes, multilayer articles, wood articles and non-woven articles.

In an embodiment, the article includes a substrate. The composition is on at least one surface of the substrate. Nonlimiting examples of suitable substrates include film, sheets, fabric, cardboard and wood. In an embodiment, the composition forms a seal between the at least one surface of the substrate and at least one surface of another substrate.

The substrate is a continuous structure with two opposing surfaces.

In an embodiment, the article includes a first substrate and a second substrate. The adhesive layer is located between the first substrate and the second substrate. The first substrate and the second substrate may be the same or different. In an embodiment, the first substrate and the second substrate are the same, such that they have the identical compositions and identical structures.

In an embodiment, the first substrate and the second substrate are compositionally distinct and/or structurally distinct from one another.

In an embodiment, the adhesive composition is applied to a surface of the first substrate. Nonlimiting examples of suitable application methods include brushing, pouring, spraying, coating, rolling, spreading, and injecting. The adhesive composition is contacted with a surface of the second substrate.

In an embodiment, the adhesive composition has a coat weight from 1 grams per square meter (g/m$^2$), or 2 g/m$^2$ to 5 g/m$^2$.

In an embodiment, the adhesive composition is uniformly applied on a surface of the first substrate to form an adhesive layer, and then the adhesive layer is brought into contact with the second substrate. A "uniform application" is a layer of the composition that is continuous (not intermittent) across a surface of the substrate, and of the same, or substantially the same, thickness across the surface of the substrate. In other words, a composition that is uniformly applied to a substrate directly contacts the substrate surface, and the composition is coextensive with the substrate surface.

The adhesive composition and the first substrate are in direct contact with each other. The term "directly contacts," as used herein, is a layer configuration whereby a substrate is located immediately adjacent to an adhesive composition, or an adhesive layer and no intervening layers, or no intervening structures, are present between the substrate and the adhesive composition, or the adhesive layer. The adhesive composition directly contacts a surface of the first substrate. In an embodiment, the adhesive layer directly contacts a surface of the second substrate.

In an embodiment, the substrate is a multilayer film, or a laminate, having a layer selected from a biaxially oriented polypropylene layer (a "BOPP Layer"), an ethylene-based polymer layer (a "Polyethylene Layer"), a cardboard layer, and combinations thereof. In a further embodiment, the substrate contains a BOPP Layer. In an embodiment, the substrate contains a BOPP Layer and a cardboard layer. The BOPP Layer directly contacts an adhesive layer containing the composition.

In an embodiment, the article includes a substrate in contact with the adhesive layer containing the composition. In a further embodiment, the substrate includes a BOPP Layer. The BOPP Layer is a film layer that directly contacts the adhesive layer.

A BOPP Layer has non-porous and non-polar surfaces, which makes it difficult to bond BOPP Layers with conventional HMAs. However, it was unexpectedly found that an article containing a substrate with a BOPP Layer in direct contact with an adhesive layer containing the present HMA composition including the combination of (A) ethylene/α-olefin copolymer having a density from 0.855 g/cc to 0.895 g/cc and a melt viscosity, at 177° C., from 5,000 mPa·s to 50,000 mPa·s; (B) functionalized propylene-based polymer containing from 1 wt % to 10 wt % functional groups, the functionalized propylene-based polymer having a melt viscosity, at 190° C., from greater than 10,000 mPa·s to 50,000 mPa·s and a weight average molecular weight, Mw, greater than 30,000 g/mol; (C) tackifier; and (D) wax exhibits the combination of (i) high fiber tear (i.e., equal to or greater than 80%) at a temperature range from −20° C. to 60° C., (ii) high heat stress (i.e., greater than, or equal to, 60° C.), and (iii) high PAFT (i.e., greater than 60° C.). The combination of high fiber tear at a temperature range from −20° C. to 60° C., high heat stress, and high PAFT is advantageous in HMA applications because the combination enables articles (such as packages) formed with the HMA to adhere over a wide range of temperatures, and to stay adhered in high temperature environments.

By way of example, and not limitation, some embodiments of the present disclosure will now be described in detail in the following Examples.

EXAMPLES

Materials used to produce compositions, further hot melt adhesive compositions, are shown in Table 1 below.

TABLE 1

Starting materials for compositions

| Component | Specification | Source |
|---|---|---|
| AFFINITY GA 1950 | ethylene/1-octene copolymer (ethylene plastomer/elastomer) density = 0.874 g/cc; Tg = −56.1° C.; melt viscosity (177° C.) = 17,000 mPa · s; Tm = 72° C.; 36 wt % octene comonomer; Tc = 54° C. | The Dow Chemical Co, |

TABLE 1-continued

Starting materials for compositions

| Component | Specification | Source |
|---|---|---|
| DUPONT FUSABOND P353 | maleic anhydride-grafted-propylene/ethylene copolymer (MAH-g-PP) density = 0.904 g/cc; MI = 470 g/10 min; Tm = 135° C.; melt viscosity (190° C.) = 15,000 mPa · s; Mw/Mn = 2.42; 1.3 wt % MAH; Vicat softening point = 112° C.; Mn = 14,940 g/mol; Mw = 36,160 g/mol; Mz = 62,460 g/mol | The Dow Chemical Co. |
| HONEYWELL A-C 597P | maleic anhydride-grafted-propylene/ethylene copolymer (MAH-g-PP) density = 0.94 g/cc; melt viscosity (190° C.) = 350 mPa · s; 7.6 wt % MAH; Mw < 10,000 g/mol; Tm = 142-152° C.; acid number = 87 mg KOH/g | Honeywell |
| HONEYWELL A-C 950P | maleic anhydride-grafted-propylene/ethylene copolymer (MAH-g-PP) density = 0.93 g/cc; melt viscosity (190° C.) = 2,000 mPa · s; 4.4 wt % MAH; Mw = 10,000 g/mol; Tm = 142-152° C.; acid number = 50 mg KOH/g; | Honeywell |
| HONEYWELL A-C 1325P | maleic anhydride-grafted-propylene-based polymer (MAH-g-PP) density = 0.92 g/cc; melt viscosity (190° C.) = 1,600 mPa · s; acid number = 18 mg KOH/g; 1.6 wt % MAH; Mw = 10,000 g/mol | Honeywell |
| AFFINITY GA 1000R | maleic anhydride-grafted-ethylene/octene copolymer (MAH-g-PE) density = 0.878 g/cc; Tg = −58° C.; melt viscosity (177° C.) = 13,000 mPa · s; Tm = 68° C.; 1.1 wt % MAH; Mw = 17,660 g/mol | The Dow Chemical Co. |
| ESCOREZ 5400 | hydrogenated hydrocarbon resin (tackifier); cycloaliphatic hydrocarbon resin; ring and ball softening point = 103.4° C.; form = flake; Mw = 670 g/mol; melt viscosity (160° C.) = 800 mPa · s; Mn = 400 g/mol; Tg = 52° C. | Exxon |
| SASOLWAX H1 | Fischer-Tropsch (FT) wax containing an ethylene-based polymer density = 0.944 g/cc (at 25° C.); drop point = 112° C.; melt viscosity (135° C.) = 8 mPa · s; Tm => 90° C.; acid value =< 0.1 mg KOH/g | Sasol Wax Company |
| IRGANOX 1010 | hindered phenol antioxidant; pentaerythritol tetrakis(3-(3,5-di-tert-butyl-4-hydroxyphenyl)propionate); density = 1.15 g/cc | BASF |

The starting materials from Table 1 are weighed into an iron container, preheated in an oven at a temperature of 177° C. for 30 minutes, and then melt blended in a heated block at a temperature of 177° C. for 10 minutes with a "Paravisc style" mixing head at 100 rotations per minute (rpm).

Laminates are formed as described in the Test Methods section using a first substrate that is a BOPP film laminated cardboard and a second substrate that is cardboard. The composition directly contacts the BOPP film of the first substrate and a surface of the second substrate. The compositions and their application performance data are provided in Table 2 below.

As shown in Table 2, CS 3 includes (A) an ethylene/octene copolymer (AFFINITY GA 1950) having (i) a density of 0.855-0.895 g/cc (0.874 g/cc) and (ii) a melt viscosity, at 177° C., from 5,000 mPa·s to 50,000 mPa·s (17,000 mPa·s); (C) tackifier (ESCOREZ 5400), and (D) wax (SASOLWAX H1)—and no (B) functionalized propylene-based polymer. CS 3 exhibits a fiber tear of less 80% (27% at −20° C., 15% at 0° C., and 70% at 60° C.) at a temperature range from −20° C. to 60° C. Consequently, CS 3 is unsuitable for HMA applications such as BOPP laminated cardboard applications.

CS 4-CS9 each includes (A) an ethylene/octene copolymer (AFFINITY GA 1950) having (i) a density of 0.855-0.895 g/cc (0.874 g/cc) and (ii) a melt viscosity, at 177° C., from 5,000 mPa·s to 50,000 mPa·s (17,000 mPa·s); (B) a maleic anhydride-grafted-propylene-based polymer (MAH-g-PP) (HONEYWELL A-C 597P, HONEYWELL A-C 950P, or HONEYWELL A-C 1325P) containing 1-10 wt % MAH (7.6 wt %, 4.4 wt %, and 1.6 wt %, respectively), the MAH-g-PP having (i) a melt viscosity, at 190° C., of less than 10,000 mPa·s (350 mPa·s, 2,000 mPa·s, and 1,600 mPa·s, respectively) and (ii) a Mw of less than 30,000 g/mol; (C) tackifier (ESCOREZ 5400), and (D) wax (SASOLWAX H1). CS 4-CS 9 each lacks a functionalized propylene-based polymer having a melt viscosity, at 190° C., from greater than 10,000 mPa·s to 50,000 mPa·s and a Mw greater than 30,000 g/mol. CS 4-€S 9 each exhibits a fiber tear of less 80% at a temperature range from −20° C. to 60° C. Consequently, CS 6-CS 9 each is unsuitable for HMA applications such as BOPP laminated cardboard applications.

TABLE 2

Compositions*

| | Ex 1 | Ex 2 | CS 2 | CS 3 | CS 4 | CS 5 | CS 6 | CS 7 | CS 8 | CS 9 | CS 10 | CS 11 |
|---|---|---|---|---|---|---|---|---|---|---|---|---|
| AFFINITY GA 1950 (ethylene/octene copolymer) | 35.0 | 30.0 | — | 40.0 | 35.0 | 30.0 | 35.0 | 30.0 | 35.0 | 40.0 | 32.0 | 24.0 |
| DUPONT FUSABOND P353 (MAH-g-PP) | 5.0 | 10.0 | — | — | — | — | — | — | — | — | — | — |
| HONEYWELL A-C 597P (MAH-g-PP) | — | — | — | — | 5.0 | 10.0 | — | — | — | — | — | — |
| HONEYWELL A-C 950P (MAH-g-PP) | — | — | — | — | — | — | 5.0 | 10.0 | — | — | — | — |
| HONEYWELL A-C 1325P (MAH-g-PP) | — | — | — | — | — | — | — | — | 5.0 | 10.0 | — | — |
| AFFINITY GA 1000R (MAH-g-PE) | — | — | — | — | — | — | — | — | — | — | 8.0 | 16.0 |
| ESCOREZ 5400 (tackifier) | 39.5 | 39.5 | — | 39.5 | 39.5 | 39.5 | 39.5 | 39.5 | 39.5 | 39.5 | 39.5 | 39.5 |
| SASOLWAX H1 (wax) | 20.0 | 20.0 | — | 20.0 | 20.0 | 20.0 | 20.0 | 20.0 | 20.0 | 20.0 | 20.0 | 20.0 |
| IRGANOX 1010 (AO) | 0.5 | 0.5 | — | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 | 100 | 100 | 100 |
| Viscosity† @ 177° C. mPa · s | 1407 | 1535 | 845 | 1200 | 1098 | 876 | 1138 | 960 | 1164 | 981 | 1053 | 986 |
| Heat Stress (° C.) | 60 | 64 | 60 | 54 | 56 | 60 | 54 | 56 | 54 | 56 | 64 | 60 |
| PAFT (° C.) | 63.4 | 84.0 | 62.4 | 55.9 | 61.8 | 65.0 | 57.3 | 63.0 | 60.3 | 67.1 | 58.6 | 61.8 |

TABLE 2-continued

Compositions*

|  | | Ex 1 | Ex 2 | CS 2 | CS 3 | CS 4 | CS 5 | CS 6 | CS 7 | CS 8 | CS 9 | CS 10 | CS 11 |
|---|---|---|---|---|---|---|---|---|---|---|---|---|---|
| SAFT (° C.) | | 92.6 | 92.9 | 94.6 | 92.5 | 94.8 | 95.9 | 93.4 | 95.7 | 97.2 | 95.5 | 88.3 | 88.8 |
| Fiber Tear (%) | −20° C. | 92 | 97 | 0 | 27 | 44 | 52 | 73 | 60 | 69 | 27 | 79 | 74 |
| | 0° C. | 98 | 99 | 10 | 15 | 70 | 60 | 78 | 76 | 60 | 46 | 28 | 46 |
| | 23° C. | 100 | 100 | 2 | 100 | 100 | 99 | 100 | 99 | 96 | 100 | 100 | 100 |
| | 60° C. | 99 | 100 | 89 | 70 | 99 | 97 | 100 | 99 | 100 | 99 | 88 | 92 |

CS—Comparative Sample
*Table 2 values are weight percent (wt %), based on the total weight of the composition
†Viscosity of the composition CS 10 and CS 11 each includes (A) an ethylene/octene copolymer (AFFINITY GA 1950) having (i) a density of 0.855-0.895 g/cc (0.874 g/cc) and (ii) a melt viscosity, at 177° C., from 5,000 mPa·s to 50,000 mPa·s (17,000 mPa·s); (B) a maleic anhydride-grafted-ethylene/octene copolymer (MAH-g-PE) (AFFINITY GA 1000R) containing 1-10 wt % MAH (1.1 wt % MAH) and having (i) a melt viscosity, at 177° C., of 13,000 mPa·s and (ii) a Mw of 17,660 g/mol; (C) tackifier (ESCOREZ 5400), and (D) wax (SASOLWAX H1). CS10 and CS11 each lacks a functionalized propylene-based polymer. CS 10 and CS 11 each exhibits a fiber tear of less 80% at a temperature range from −20° C. to 60° C. Consequently, CS 10 and CS 11 each is unsuitable for HMA applications such as BOPP laminated cardboard applications.

In contrast, a composition (Ex 1 and Ex 2) including (A) ethylene/octene copolymer (AFFINITY GA 1950) having (i) a density of 0.855-0.895 g/cc (0.874 g/cc) and (ii) a melt viscosity, at 177° C., from 5,000 mPa·s to 50,000 mPa·s (17,000 mPa·s); (B) maleic anhydride-grafted-propylene/ethylene copolymer (MAH-g-PP) (DUPONT FUSABOND P353) containing 1-10 wt % MAH (1.3 wt % MAH) and having (i) a melt viscosity, at 190° C., from greater than 10,000 mPa·s to 50,000 mPa·s (15,000 mPa·s) and (ii) a Mw greater than 30,000 g/mol (36,160 g/mol); (C) tackifier (ESCOREZ 5400), and (D) wax (SASOLWAX H1) unexpectedly exhibits the combination of (i) a fiber tear of greater than 80% at a temperature range from −20° C. to 60° C. and (ii) a heat stress greater than, or equal to, 60° C. Consequently, Ex 1 and Ex 2 each is suitable for HMA applications such as BOPP laminated cardboard applications.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A composition comprising:
   (A) from 20 to 50 wt % of an ethylene/α-olefin copolymer consisting of (i) ethylene and (ii) $C_4$-$C_8$ α-olefin comonomer, ethylene/α-olefin copolymer having
   a density from 0.855 g/cc to 0.895 g/cc
   a melt viscosity, at 177° C., from 5,000 mPa·s to 50,000 mPa·s;
   (B) from 5 to 10 wt % of a functionalized propylene-based polymer that is a maleic anhydride-grafted propylene/α-olefin copolymer comprising from 1 wt % to 10 wt % functional groups, the functionalized propylene-based polymer having
   a melt viscosity, at 190° C., from greater than 10,000 mPa·s to 50,000 mPa·s;
   a weight average molecular weight, Mw, from 31,000 g/mol to 40,000 g/mol;
   a Mw/Mn from 2.0 to 3.0;
   a melt index from 100 g/10 min to 1000 g/10 min;
   (C) from 20 to 60 wt % of a tackifier;
   (D) from 10 to 40 wt % of a wax; and
   (E) from 0 wt % to 3 wt % additive, and
   (A)-(E) amount to 100 wt % of the composition, and the composition has
   a melt viscosity at 177° C. from 500 mPa·s to 2,000 mPa·s; and
   a fiber tear greater than 80% at a temperature range from −20° C. to 60° C.

2. The composition of claim 1, wherein the tackifier is a hydrogenated hydrocarbon resin.

3. The composition of claim 1, wherein the wax is an ethylene-based wax.

4. The composition of claim 1 comprising
   (A) from 25 to 40 wt % of the ethylene/α-olefin copolymer consisting of (i) ethylene and (ii) $C_4$-$C_8$ α-olefin comonomer;
   (B) from 5 to 10 wt % of the functionalized propylene-based polymer;
   (C) from 35 to 40 wt % tackifier;
   (D) from 20 to 25 wt % wax; and
   (E) from 0 wt % to 3 wt % additive.

5. The composition of claim 1, wherein the composition has a heat stress greater than, or equal to, 60° C.

6. The composition of claim 1 wherein the additive is selected from the group consisting of plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants, fluorescing agents, compatibilizers, antimicrobial agents, water, and combinations thereof.

7. The composition of claim 1 wherein the additive is present and the additive is an antioxidant.

8. An article comprising at least one component formed from the composition of claim 5.

9. The article of claim 8 comprising a substrate in contact with an adhesive layer comprising the composition.

10. The article of claim 9, wherein the substrate comprises a biaxially oriented polypropylene layer (BOPP Layer), and the BOPP Layer is in direct contact with the adhesive layer.

11. A composition comprising:
   (A) from 25 to 40 wt % of an ethylene/α-olefin copolymer consisting of (i) ethylene and (ii) $C_4$-$C_8$ α-olefin comonomer, ethylene/α-olefin copolymer having
   a density from 0.855 g/cc to 0.895 g/cc
   a melt viscosity, at 177° C., from 5,000 mPa·s to 50,000 mPa·s;

(B) from 5 to 10 wt % of a functionalized propylene-based polymer comprising from 1 wt % to 10 wt % functional groups, the functionalized propylene-based polymer having
  a melt viscosity, at 190° C., from greater than 10,000 mPa·s to 50,000 mPa·s;
  a weight average molecular weight, Mw, from 31,000 g/mol to 40,000 g/mol;
  a z-average molecular weight, Mz, from 50,000 g/mol to 70,000 g/mol;
(C) from 20 to 60 wt % of a tackifier;
(D) from 10 to 40 wt % of a wax; and
(E) from 0 wt % to 3 wt % additive; and
the composition has
(i) a melt viscosity at 177° C. from 500 mPa·s to 2,000 mPa·s, and
(ii) a fiber tear greater than 90% at a temperature range from −20° C. to 60° C.

12. The composition of claim 11 wherein the functionalized propylene-based polymer is a maleic anhydride-grafted propylene-based polymer having
  a Mw/Mn from 2.0 to 3.0; and
  a melt index from 100 g/10 min to 1000 g/10 min.

* * * * *